United States Patent
Paulson et al.

(10) Patent No.: US 8,260,982 B2
(45) Date of Patent: Sep. 4, 2012

(54) METHOD FOR REDUCING LATENCY

(75) Inventors: Christopher D. Paulson, Fort Collins, CO (US); Timothy D. Thompson, Windsor, CO (US); Kevin T. Campbell, Windsor, CO (US)

(73) Assignee: LSI Corporation, Milpitas, CA (US)

( * ) Notice: Subject to any disclaimer, the term of this patent is extended or adjusted under 35 U.S.C. 154(b) by 1640 days.

(21) Appl. No.: 11/147,855

(22) Filed: Jun. 7, 2005

(65) Prior Publication Data

US 2006/0277329 A1  Dec. 7, 2006

(51) Int. Cl.
*G06F 3/00* (2006.01)

(52) U.S. Cl. .......................... 710/33; 710/51

(58) Field of Classification Search ............ 710/52, 710/61, 39, 36, 58; 365/189.05, 189.04, 365/221; 713/400; 375/371, 354; 368/233, 368/194; 327/198
See application file for complete search history.

(56) References Cited

U.S. PATENT DOCUMENTS

| | | | | |
|---|---|---|---|---|
| 4,999,528 A | * | 3/1991 | Keech | 327/198 |
| 5,357,613 A | * | 10/1994 | Cantrell et al. | 710/61 |
| 5,434,996 A | * | 7/1995 | Bell | 713/400 |
| 5,509,038 A | * | 4/1996 | Wicki | 375/371 |
| 5,644,604 A | * | 7/1997 | Larson | 375/354 |
| 5,884,100 A | * | 3/1999 | Normoyle et al. | 710/52 |
| 6,009,531 A | * | 12/1999 | Selvidge et al. | 713/400 |
| 6,058,439 A | * | 5/2000 | Devereux | 710/52 |
| 6,098,139 A | * | 8/2000 | Giacobbe et al. | 710/58 |
| 6,115,760 A | * | 9/2000 | Lo et al. | 710/52 |
| 6,134,155 A | * | 10/2000 | Wen | 365/189.04 |
| 6,345,328 B1 | * | 2/2002 | Rozario et al. | 710/52 |
| 6,396,887 B1 | * | 5/2002 | Ware et al. | 375/354 |
| 6,603,706 B1 | * | 8/2003 | Nystuen et al. | 365/233.1 |
| 6,718,449 B2 | * | 4/2004 | Phi | 711/167 |
| 6,760,392 B1 | * | 7/2004 | Tan et al. | 375/354 |
| 6,813,275 B1 | * | 11/2004 | Sharma et al. | 370/412 |
| 2003/0169644 A1 | * | 9/2003 | Liao | 368/233 |
| 2004/0243869 A1 | * | 12/2004 | Sharma et al. | 713/400 |

OTHER PUBLICATIONS

Stein et al., Crossing the Abyss: Asynchronous Signals in a Synchronous World, 2003, EDN, pp. 59-60, 62, 64, 66 and 68-69.*
Cadence, Clock Domain Crossing, 1999, pp. 1-13.*
Texas Instruments, FIFO Memories: Solution to Reduce FIFO Metastability, 1996, pp. 1-6.*

* cited by examiner

*Primary Examiner* — Cheng-Yuan Tseng
(74) *Attorney, Agent, or Firm* — Christopher P. Whitham; Cochran Freund & Young LLC (57) ABSTRACT

Disclosed is a method for reducing latency between two clock domains in a digital electronic device. The time between a write to a queue position and a corresponding read of the queue position is reduced by up to one clock cycle by including a delay in the time before first writing data to a First In First Out (FIFO) queue used to buffer and synchronize data between two clock domains. The two clock domains have the same frequency, but may be out of phase. Reducing the latency between the write and the corresponding read reduces the required size of the FIFO queue and also results in more efficient system operation.

11 Claims, 6 Drawing Sheets

400 FLOW CHART OF WRITE POINTER MANIPULATION

500 FLOW CHART OF READ POINTER MANIPULATION

FIGURE 5

FIGURE 6

METHOD FOR REDUCING LATENCY

BACKGROUND OF THE INVENTION a. Field of the Invention

The present invention generally pertains to digital electronics and more particularly to electronic devices with multiple clock domains.

b. Description of the Background

Due to the nature of digital electronics almost all digital electronic designs utilize a clock to perform sampling of digital data. As the digital electronics become more complex the use of multiple clocks on the same device has become very common. The use of multiple clocks may create a system that has multiple clock domains. When data in one clock domain is needed in another clock domain, the data must be synchronized between the two domains to ensure that the timing differences between the two clock domains is accounted for properly.

A common device that has multiple clock domains is a transceiver. Typically there is a clock domain for the receiver and a clock domain for the transmitter. The transceiver may be either a serial or parallel communications transceiver. Multiple clock domains are not limited to just transceiver applications. Due to the necessity to periodically sample digital data, any digital electronic device may have multiple clocks and, thus, multiple clock domains. In addition to timing communication signals, the clock in the digital electronic device may be used to coordinate control signals. Control signals are the core of a smart electronic device and, hence, synchronizing multiple clock domains may be necessary on any digital electronic device.

SUMMARY OF THE INVENTION

An embodiment of the present invention may therefore comprise a method for synchronizing data between two clock domains comprising the steps of: delaying a first data write to a FIFO queue from a first clock domain by up to one write clock cycle, and reducing latency between subsequent data writes to the FIFO queue and data reads from the FIFO queue into a second clock domain by the up to one write clock cycle, the first clock domain and the second clock domain having equivalent frequencies, the first clock domain and the second clock having any phase relationship with respect to each other.

An embodiment of the present invention may further comprise a digital electronic device with multiple clock domains comprising: a write delay subsystem that delays a first data write to a FIFO queue from a first clock domain by up to one write clock cycle that reduces latency between subsequent data writes to the FIFO queue and data reads from the FIFO queue into a second clock domain by the up to one write clock cycle, the first clock domain and the second clock domain having equivalent frequencies, the first clock domain and the second clock having any phase relationship with respect to each other.

An embodiment of the present invention may further comprise a digital electronic device with multiple clock domains comprising: means for delaying a first data write to a FIFO queue from a first clock domain by up to one write clock cycle; and means for reducing latency between subsequent data writes to the FIFO queue and data reads from the FIFO queue into a second clock domain by the up to one write clock cycle.

DETAILED DESCRIPTION OF THE INVENTION

Figure 1:
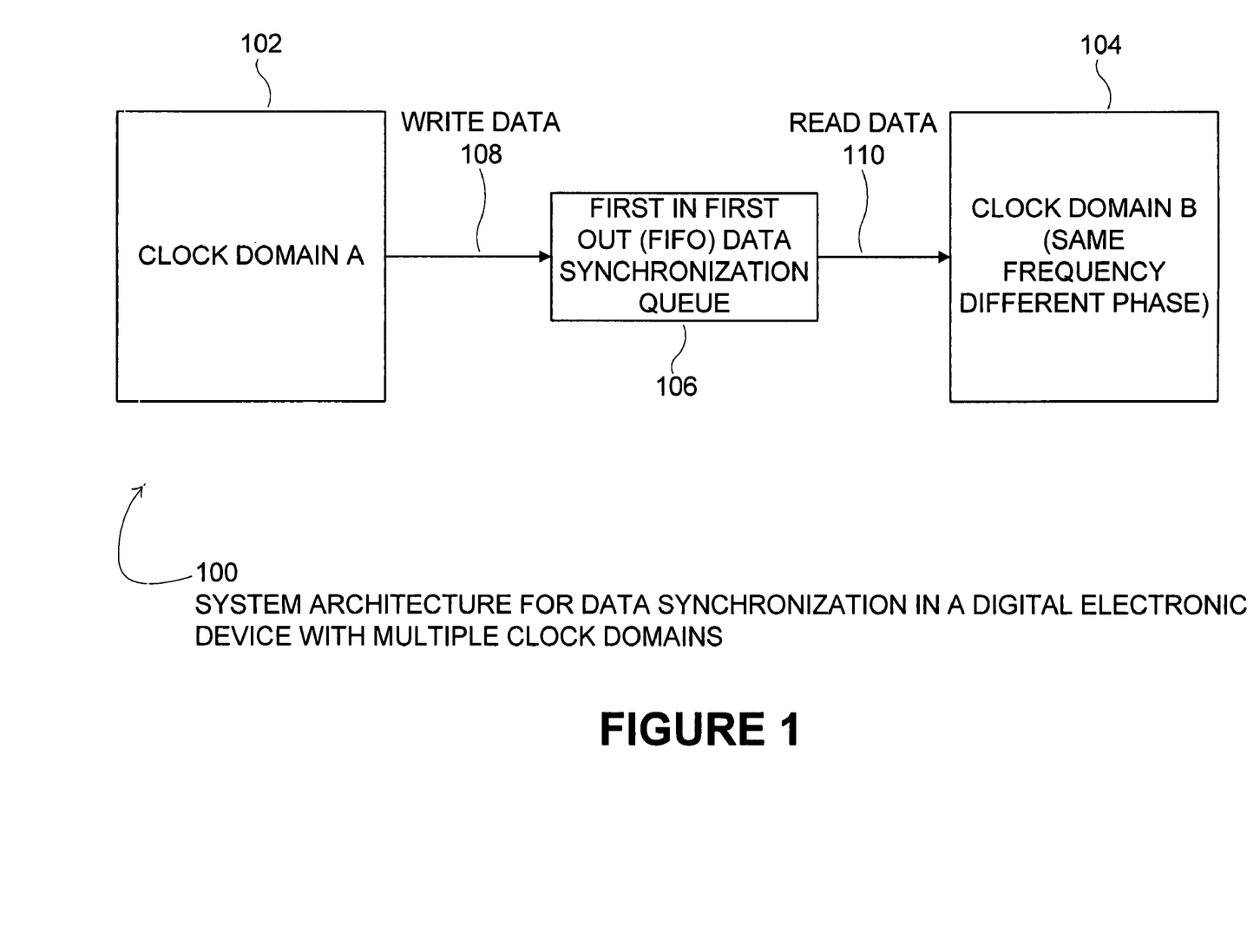
FIG. 1 is a schematic illustration of the system architecture for data synchronization between two clock domains of a digital electronic device.

FIG. 1 is a schematic illustration of the system architecture 100 for data synchronization between two clock domains 102, 104 of a digital electronic device. The system illustrated 100 in FIG. 1 contains clock domain A 102 which is writing (sending) data to clock domain B 104. A First In First Out (FIFO) data queue 106 is used to hold data while the data is being transferred from clock domain A 102 to clock domain B 104. Clock domain A 102 first writes data 108 to the FIFO data synchronization queue 106. The written data 108 is stored in the FIFO queue 106 until the data is read 110 into clock domain B 104. The FIFO queue 106 is a circular queue where when data is written 108 into the last position in the queue 106, the write process will return to write data to the first position of the queue 106 for the next write 108. Data is read in a similar fashion where when data is read 110 from the last position of the FIFO queue 106, the next data read 110 will come from the first position of the FIFO queue 106. Since data cannot be read 110 at the same time the data is written 110, clock domain A 102 must write to a FIFO queue 106 position prior to clock domain B 104 attempting to read the data 110 from the FIFO queue 106.

Figure 2:
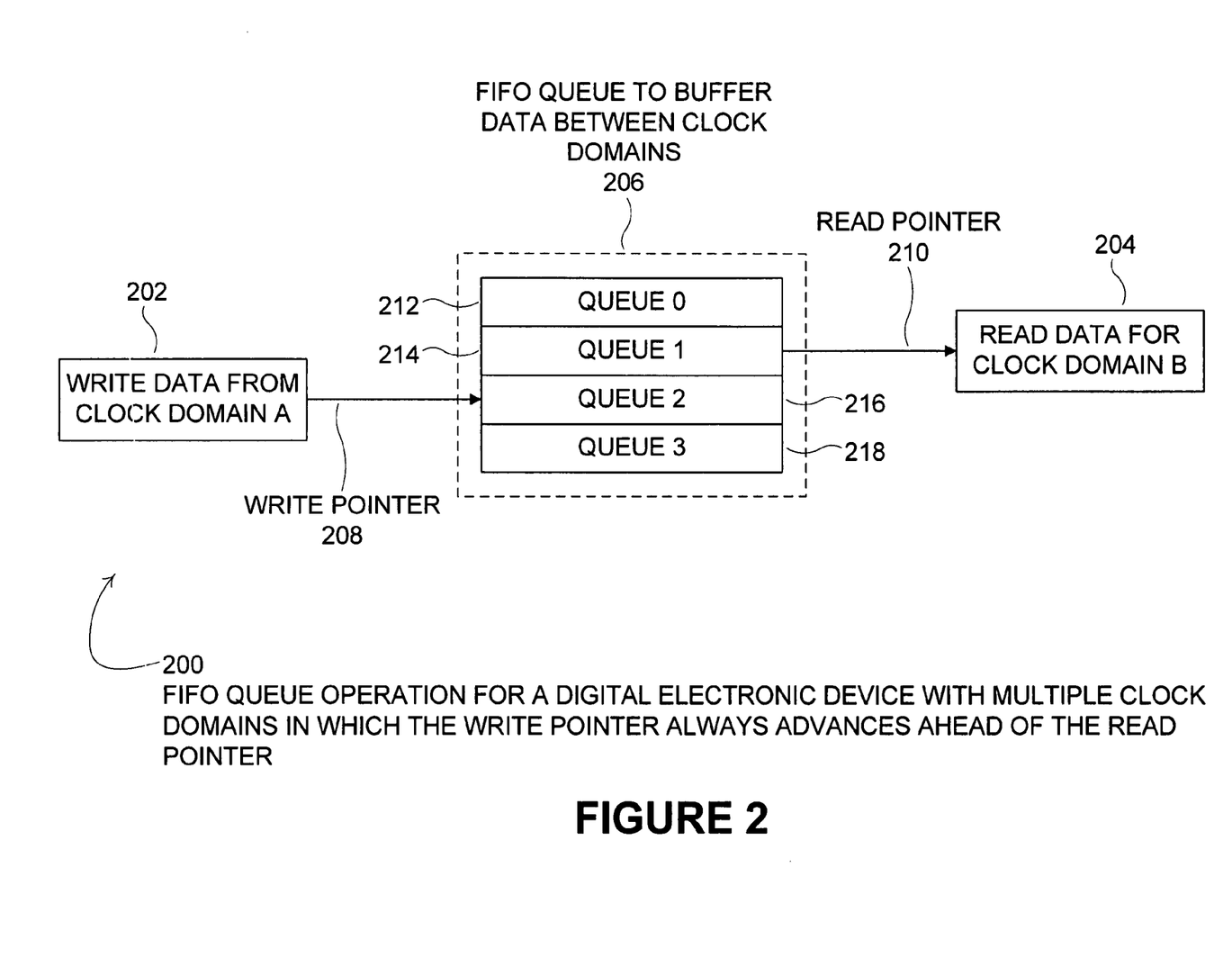
FIG. 2 is a schematic illustration of First In First Out (FIFO) queue operation for a digital electronic device with multiple clock domains.

FIG. 2 is a schematic illustration 200 of First In First Out (FIFO) queue 206 operation for a digital electronic device with multiple clock domains 202, 204. A four position FIFO queue 206 has data written from clock domain A 202 into the FIFO queue 206. Clock domain B 204 reads the data from the FIFO queue 206. Which FIFO queue 206 position 212, 214, 216, 218 to write the clock domain A data 202 to is determined by the write pointer 208. Which FIFO queue 206 position 212, 214, 216, 218 to read data from is determined by the read pointer 210. The write pointer 208 must always be at least one position ahead of the read pointer 210 since data cannot be read and written at the same time. Both write 208 and read 210 pointers initially point at queue position 0 (212), then change to point at queue position 1 (214), then point to queue position 2 (216), and finally point to queue position 3 (218). After queue position 3 (218), the read and write pointers return to point at queue position 0 (212) and continue repeating the described progression until the system is reset or the system has a power cycle. To accommodate the fact that a queue position 212, 214, 216, 218 cannot be written to and read from at the same time, the read process is initially delayed so that the read pointer 210 trails the write pointer 202 such that the write process is complete before the read pointer 210 points to the data in the FIFO queue 206. The further the read pointer 210 trails the write pointer 208, the larger the FIFO queue 206 must be to ensure that the write pointer 208 does not return to catch up to the read pointer 210 from behind in the circular FIFO queue 206 and overwrite data in the FIFO queue 206 before the data has been read into clock domain B 204. The time difference between a read 204 and a write 202 is considered the latency of the system. Thus, the higher the latency between a read 204 and a write 202, the larger the FIFO queue 206 must be to buffer the data between the two clock domains. The FIFO queue 206 illustrated 200 in FIG. 2 has four queue positions, however, the FIFO queue 206 may be of any size as long as the position difference between the read 210 and write 208 pointers guarantees that a read 210 and write 208 do not access the same queue position 212, 214, 216, 218 at the same time.

Figure 3:
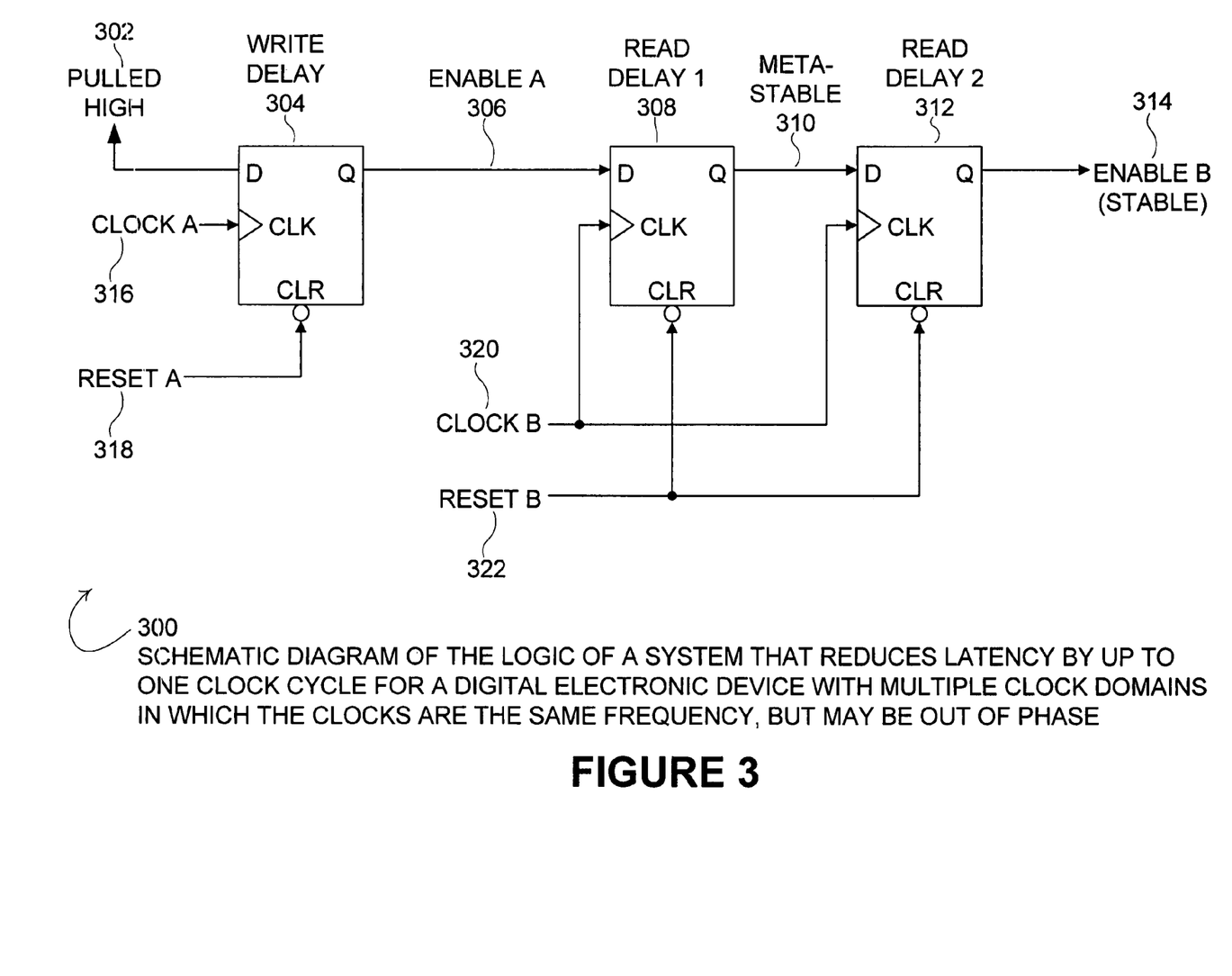
FIG. 3 is a schematic diagram of the logic of an embodiment that reduces latency between one clock domain and another clock domain of a digital electronic device by up to one clock cycle.

FIG. 3 is a schematic diagram of the logic 300 of an embodiment that reduces latency between one clock domain and another clock domain of a digital electronic device by up to one clock cycle. A write delay is implemented using a DQ flip-flop 304, delaying the initial write after a reset or power cycle by one clock A (write clock) 316 cycle. Since the read system for clock domain B must be delayed to account for data stability and to ensure that the read process stays behind the write process, delaying the write process on the first write by up to one clock cycle reduces the latency between all future write and read actions. The input of the write delay flip-flop 304 is tied high 302 and the clock is tied to the clock domain A clock 316. The write delay flip-flop 304 is cleared, or reset, by the clock domain A reset 318. The output of the write delay flip-flop 304 is used as the enable 306 for the write process of clock domain A. The write delay flip-flop 304 delays the write process by up to one domain A clock 316 cycle. Another DQ flip-flop 308 is used to delay the read process based on the clock domain B clock 320 and the clock domain B reset 322. Enable A 306 is fed into the input of the read delay 1 flip-flop 308. The read delay 1 flip-flop 308 gets the system into a meta-stable state 310 after one clock domain B clock 320 cycle. Reading data in the meta-stable state 310 may result in invalid data. To avoid invalid data, a second DQ flip-flop 312 is used to delay the read one more read delay clock 320 cycle. The output of the read delay 2 flip-flop 312 is set to turn on only after the FIFO read position is stable 314. The output of the read delay 2 flip-flop 312 is also the clock domain B read enable 314. The read enable 314 turns on the read process for clock domain B. The delays from the read 308, 312 and the write 304 flip-flops is only applicable on the first read and write after a system reset or power cycle. The domain A clock 316 and the domain B clock 320 must be the same frequency, but the two clocks 316, 320 may be out phase.

Figure 4:
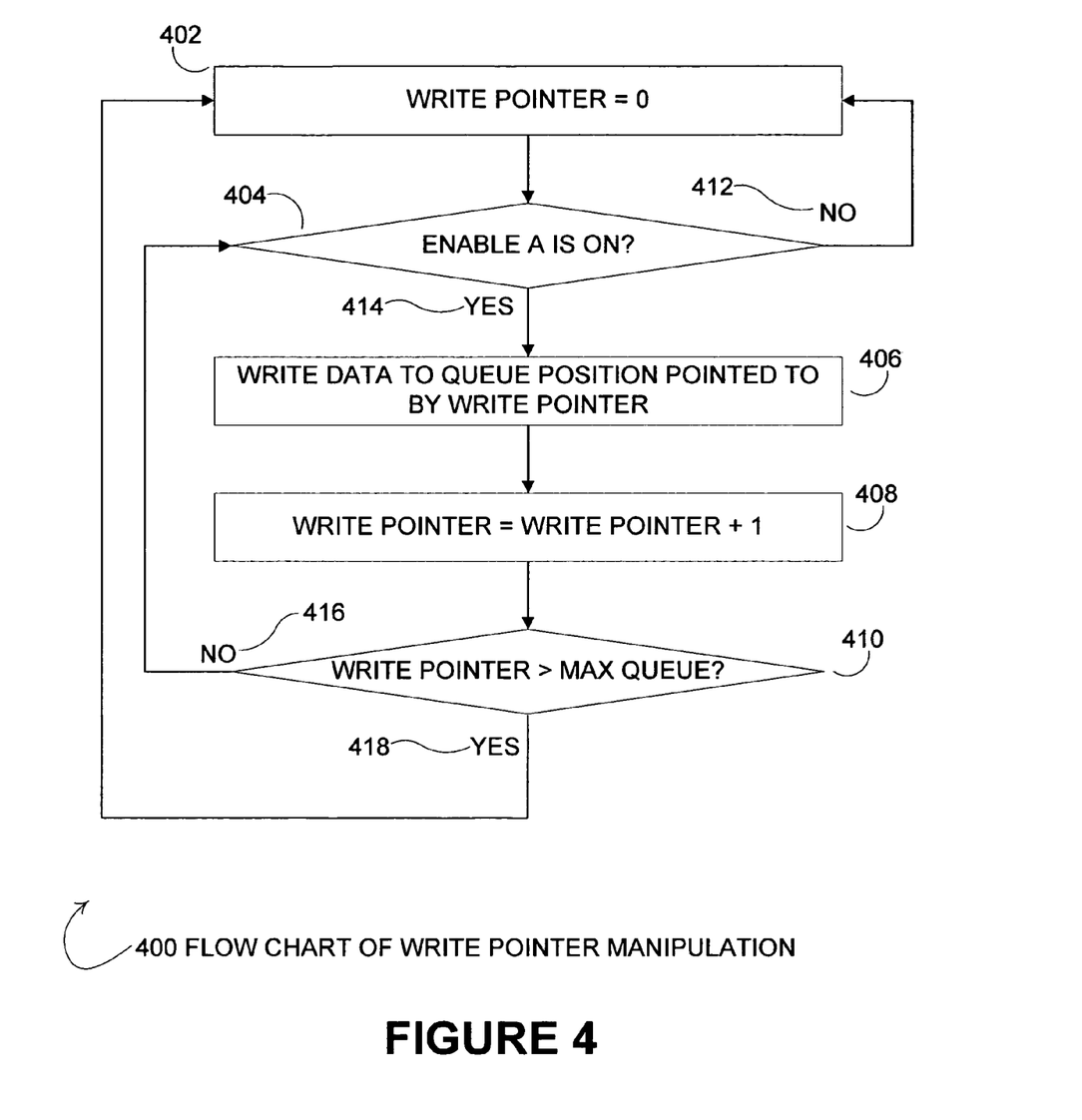
FIG. 4 is a flow chart of the manipulation of the write pointer for an embodiment that synchronizes data between two clock domains of a digital electronic device.

FIG. 4 is a flow chart of the manipulation of the write pointer 400 for an embodiment that synchronizes data between two clock domains of a digital electronic device. The flow chart 400 in FIG. 4 deals with pointer arithmetic. Pointers are memory indexes, and may be any index within the memory of a computer system. Generally, when accessing data with pointers, a data structure, such as the FIFO queue in the embodiments, utilizes consecutive memory segments and adding one to a pointer, or incrementing the pointer, moves the pointer to the next memory position. The pointer typically starts at a base value and all values are offsets from the base pointer value. For simplicity the pointer in FIG. 4 has a base value of 0, which is very unlikely in real world use. The write pointer process starts by initializing the write pointer to a value of 0 (402). The system then checks to see if enable A (write enable) has turned on 404. If enable A is not on 414, the system returns to the start 402 and sets the write pointer to 0 (402). After setting the write pointer to 0 (402), the system then checks to see if enable A is on again 404. If enable A is on 416, the system writes data to the queue position pointed to by the queue pointer 408, which is initially queue position 0. After the system writes data to the queue, the write pointer is incremented by one (408). Once the write pointer is incremented 408, the system checks to see if the write pointer exceeds the maximum queue position 410. If the write pointer does not exceed the maximum queue position, then the system returns to check to see if enable A is on 404. Once the write pointer exceeds the maximum queue position, the system returns to set the write pointer to 0 (402) prior to checking to see if enable A is on 404. The process iteratively continues until enable A is turned off or there is a power cycle.

Figure 5:
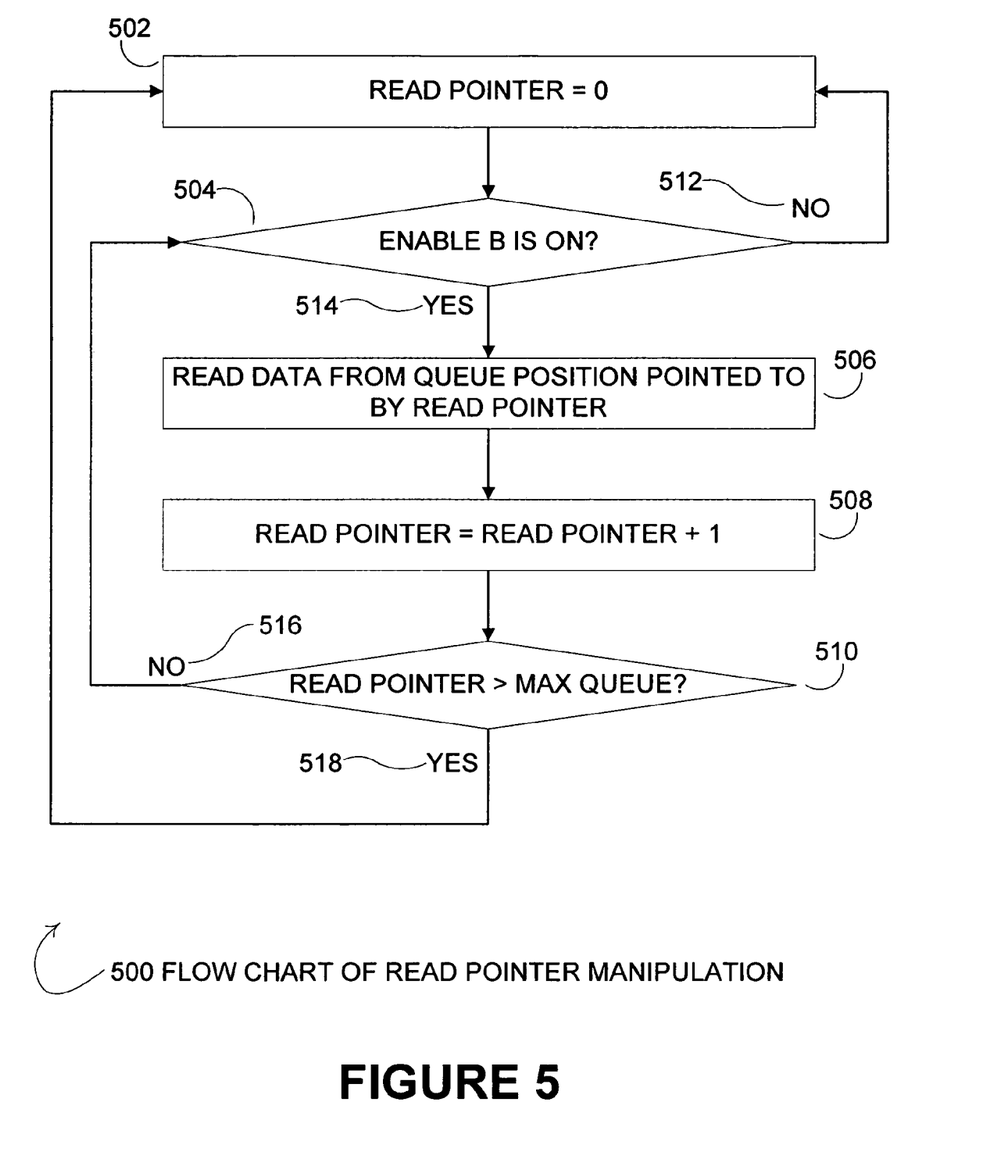
FIG. 5 is a flow chart of the manipulation of the read pointer for an embodiment that synchronizes data between two clock domains of a digital electronic device.

FIG. 5 is a flow chart of the manipulation of the read pointer 500 for an embodiment that synchronizes data between two clock domains of a digital electronic device. The flow chart 500 in FIG. 5 deals with pointer arithmetic with the same considerations as the description with respect to FIG. 4. For simplicity the pointer in FIG. 5 has a base value of 0 as does the write pointer described with respect to FIG. 4. Since FIG. 4 and FIG. 5 describe access to the same FIFO queue data structure, the base value of the write pointer and read pointer is the same value. The read pointer process starts by initializing the read pointer to a value of 0 (502). The system then checks to see if enable B (read enable) has turned on 504. If enable B is not on 514, the system returns to the start 502 and sets the read pointer to 0 (502). After setting the read pointer to 0 (502), the system then checks to see if enable B is on again 504. If enable B is on 516, the system read data from the queue position pointed to by the queue pointer 508, which is initially queue position 0. After the system reads data from the queue, the read pointer is incremented by one (508). Once the read pointer is incremented 508, the system checks to see if the read pointer exceeds the maximum queue position 510. If the read pointer does not exceed the maximum queue position, then the system returns to check to see if the enable B is on 504. Once the read pointer exceeds the maximum queue position, the system returns to set the read pointer to 0 (502) prior to checking to see if enable B is on 504. The process iteratively continues until enable B is turned off or there is a power cycle. Enable B is turned on up to two clock cycles after enable A to permit the write process to write data before the read process reads the data.

The logical if/then condition with respect to FIG. 4 and FIG. 5 may be changed to a negative reflection of the value or to a greater than or equal test condition and still perform the same overall function. Different logical tests may be used as long as the general circular access to the FIFO queue is accomplished.

Figure 6:
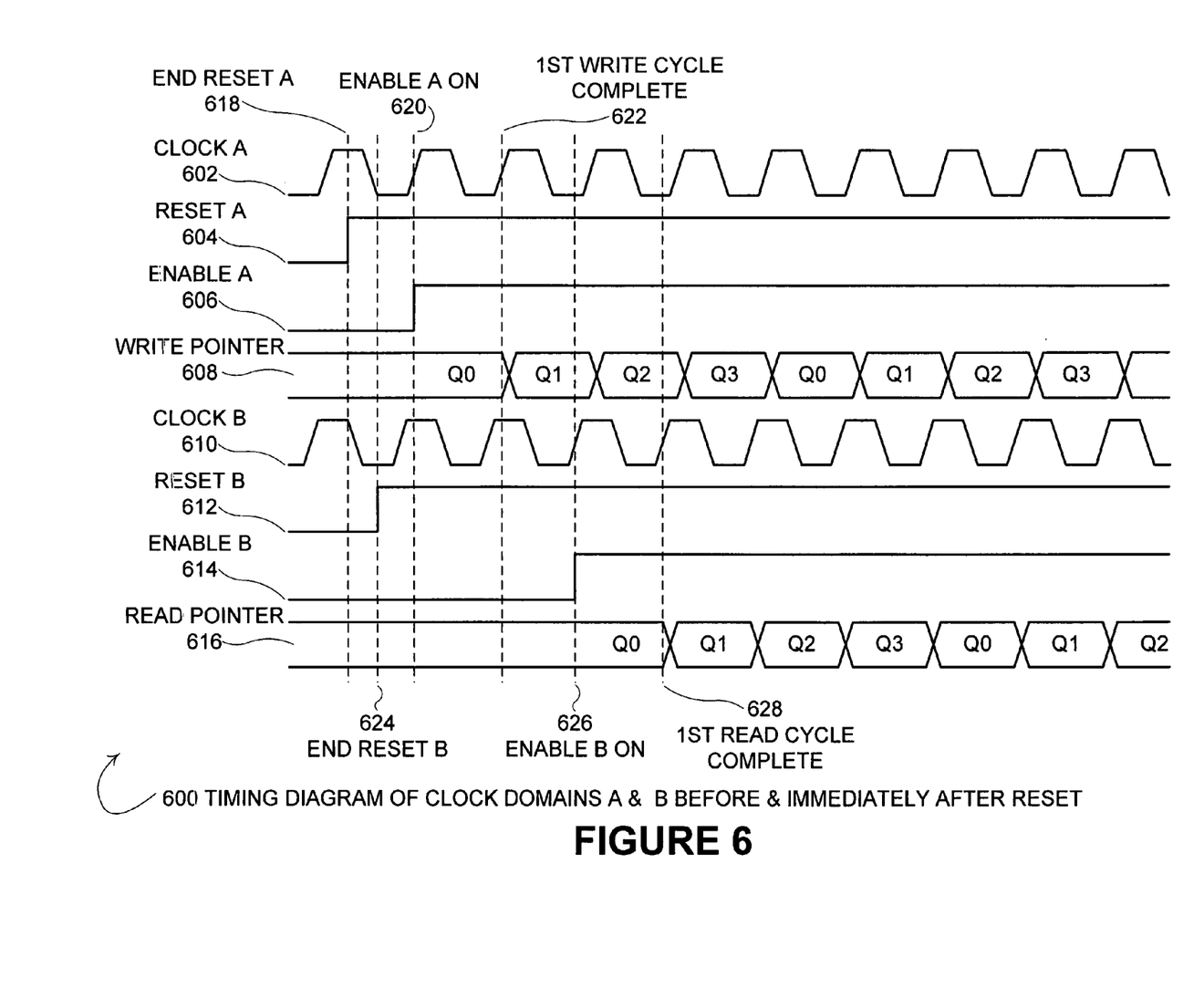
FIG. 6 a is timing diagram for an embodiment showing the relationship of various signals versus time immediately before and after a reset action on a digital electronic device with two clock domains.

FIG. 6 is a timing diagram 600 for an embodiment showing the relationship of various signals versus time immediately before and after a reset action on a digital electronic device with two clock domains. Clock A 602 and clock B 608 are the same frequency but the clocks 602, 608 are slightly out of phase. The end of the reset A state 618 is detected when reset A 604 goes high 618. Enable A (write enable) 606 does not turn on 620 until the next clock A (write clock) 602 leading edge is detected. Once enable A (write enable) 606 is turned on 620, the write process is begun 620. The write pointer 608 is initially set to queue position 0 and the initial write cycle 622 writes data to queue position 0. Once enable A (write enable) 606 is turned on 618, the write process described with respect to FIG. 4 increments the write pointer 608, and the write process iteratively writes data to each position in the FIFO buffer on each successive clock A (write clock) 602 leading edge.

Enable B (read enable) 614 is delayed longer than enable A (write enable) 606. Enable B (read enable) 614 will not turn on 626 until both enable A (write enable) 606 is on and reset B 612 goes high 624. The end of the reset B state 624 is detected when reset B 612 goes high 624. Enable B (read enable) 614 turns on 626 when the second leading clock edge of clock B (read clock) 610 is detected after both reset B 612 goes high 624 and enable A 606 is on 620. The read pointer 616 is initially set to queue position 0 and the initial read cycle 628 reads data from queue position 0. Once enable B (read enable) 614 is turned on the read process described with respect to FIG. 5 increments the read pointer 616 and the read process iteratively reads data from each position in the FIFO buffer on each successive clock B (read clock) 610 leading edge. The read pointer 616 is always up to two clock cycles behind write pointer 608.

The timing diagram 600 in FIG. 6 represents one of only several valid reset actions for an embodiment. The exact features of the timing diagram 600 are dependent on a number of factors, including: when reset A and reset B go high, and what the phase difference, if any, is between clock A and clock B. The timing diagram also depicts positive/leading edge DQ flip-flop action, but the system may be implemented using negative/trailing edge DQ flip-flops. Similarly, the system shows active low reset values 604, 612, but an active high reset may be used as well.

Various embodiments therefore provide the ability for a digital electronic device with multiple clock domains to reduce the latency between a data write from one clock domain to another clock domain by up to a full clock cycle. Reducing the data transfer latency has the benefit of reducing the required size for a FIFO queue used to buffer the data while transferring the data between clock domains. The various embodiments provide a more efficient transfer of data while reducing the required system resources required for the FIFO queue buffer.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for synchronizing data between two clock domains comprising:

delaying a first data write to a FIFO queue from a first (write) clock domain by up to one write clock cycle thereby reducing latency between subsequent data writes to said FIFO queue and data reads from said FIFO queue into a second (read) clock domain by said up to one write clock cycle, said first (write) clock domain and said second (read) clock domain having equivalent frequencies, said first (write) clock domain and said second (read) clock domain having any phase relationship with respect to each other;

delaying a first data read of said FIFO queue by up to a first read clock cycle occurring after said up to one write clock cycle to achieve a meta-stable data storage condition;

writing a first data element into a first position of said FIFO queue;

delaying said first data read of said FIFO queue by up to a second read clock cycle to achieve a stable data storage condition;

reading said first data element from said first position of said FIFO queue;

writing data to each position in said FIFO queue by writing data to a position in said FIFO queue on a write clock cycle and writing to a next position of said FIFO queue on a next write clock cycle, said next position of said FIFO queue being said first position of said FIFO queue when a last position of said FIFO queue was written on said write clock cycle; and reading each written data position in said FIFO queue less than two read clock cycles after said written data position of said FIFO queue receives data from said first (write) clock domain.

2. The method for synchronizing data between two clock domains of claim 1 wherein delaying of said first data write is accomplished using a DQ flip-flop.

3. The method for synchronizing data between two clock domains of claim 1 wherein delaying of said first read is accomplished using DQ flip-flops.

4. The method for synchronizing data between two clock domains of claim 1 wherein said FIFO queue is a first in first out queue system.

5. A digital electronic device with multiple clock domains comprising:

a write delay subsystem that delays a first data write to a FIFO queue from a first (write) clock domain by up to one write clock cycle that reduces latency between subsequent data writes to said FIFO queue and data reads from said FIFO queue into a second (read) clock domain by said up to one write clock cycle, said first (write) clock domain and said second (read) clock domain having equivalent frequencies, said first (write) clock domain and said second (read) clock domain having any phase relationship with respect to each other;

a read delay subsystem that delays a first read of said FIFO queue by up to two read clock cycles after said up to one write clock cycle in order to achieve a stable data storage condition;

a write data subsystem that writes data to a position of said FIFO queue starting at a first position of said FIFO queue, said write data subsystem writing data to each position in said FIFO queue by writing data to a position in said FIFO queue on a write clock cycle and writing to a next position of said FIFO queue on a next write clock cycle, said next position of said FIFO queue being said first position of said FIFO queue when a last position of said FIFO queue was written on said write clock cycle; and a read data subsystem that reads each written data position in said FIFO queue less than two read clock cycles after said written data position of said FIFO queue receives data from said write data subsystem.

6. The digital electronic device with multiple clock domains of claim 5 wherein said write delay subsystem is implemented using a DQ flip-flop.

7. The digital electronic device with multiple clock domains of claim 5 wherein said read delay subsystem is implemented using two DQ flip-flops.

8. The digital electronic device with multiple clock domains of claim 5 wherein said FIFO queue is a first in first out queue system.

9. A digital electronic device with multiple clock domains comprising:
   means for delaying a first data write to a FIFO queue from a first (write) clock domain by up to one write clock cycle, said first (write) clock domain and said second (read) clock domain having equivalent frequencies, and said first (write) clock domain and said second (read) clock domain having any phase relationship with respect to each other;
   means for delaying a first data read of said FIFO queue by up to a first read clock cycle occurring after said up to one write clock cycle;
   means for writing a first data element into a first position of said FIFO queue;
   means for delaying said first data read of said FIFO queue by up to a second read clock cycle;
   means for reading said first data element from said first position of said FIFO queue;
   means for writing data to each position in said FIFO; and
   means for reading each written data position in said FIFO queue less than two read clock cycles after said written data position of said FIFO queue receives data from said first (write) clock domain.

10. The method for synchronizing data between two clock domains of claim 1 wherein said write delay subsystem and said read delay subsystem combination further comprises:
   a write delay flip-flop that is a DQ flip-flop with a D input connected to a high voltage source, a clock input connected to a first (write) clock signal from said first (write) clock domain, a clear input connected to a reset write signal source, and a Q output that sends an enable write signal such that when a reset write signal is received said write delay flip-flop turns off said enable write signal until said clock input of said write delay flip-flop receives a first (write) clock domain signal pulse from said first (write) clock signal at which time said write delay flip-flop turns on said enable write signal and such that said first data write to said FIFO queue starts when said enable write signal turns on;
   a first read delay flip-flop that is a DQ flip-flop with a D input connected to said enable write signal of said write delay flip-flop, a clock input connected to a second (read) clock signal from said second (read) clock domain, a clear input connected to a reset read signal source, and a Q output that sends a meta-stable state enable signal such that when a reset read signal is received said first read delay flip-flop turns off said meta-stable state enable signal until said enable write signal is turned on when a second (read) clock domain signal pulse from said second (read) clock signal is received at which time said first read delay flip-flop turns on said meta-stable state enable signal and such that said first read delay flip-flop turns off said meta-stable state enable signal when said enable write signal is off; and
   a second read delay flip-flop that is a DQ flip-flop with a D input connected to said meta-stable state enable signal of said first read delay flip-flop, a clock input connected to said second (read) clock signal from said second (read) clock domain, a clear input connected to said reset read signal source, and a Q output that sends an enable read signal such that when a reset read signal is received said second read delay flip-flop turns off said enable read signal until said meta-stable state enable signal is turned on when said second (read) clock domain signal pulse from said second (read) clock signal is received at which time said second read delay flip-flop turns on said enable read signal, such that said second read delay flip-flop turns off enable read signal when said enable meta-stable state enable signal is off, and such that said first data read of said FIFO queue starts when said enable read signal turns on.

11. The digital electronic device with multiple clock domains of claim 5 wherein said delaying said first data write to said FIFO queue from said first (write) clock domain by up to said one write clock cycle, said delaying said first data read of said FIFO queue by up to said first read clock cycle, and said delaying said first data read of said FIFO queue by up to said second read clock cycle further comprises:
   supplying a write delay flip-flop that is a DQ flip-flop with a D input connected to a high voltage source, a clock input connected to a first (write) clock signal from said first (write) clock domain, a clear input connected to a reset write signal source, and a Q output that sends an enable write signal such that when a reset write signal is received said write delay flip-flop turns off said enable write signal until said clock input of said write delay flip-flop receives a first (write) clock domain signal pulse from said first (write) clock signal at which time said write delay flip-flop turns on said enable write signal and such that said write data subsystem starts when said enable write signal turns on;
   supplying a first read delay flip-flop that is a DQ flip-flop with a D input connected to said enable write signal of said write delay flip-flop, a clock input connected to a second (read) clock signal from said second (read) clock domain, a clear input connected to a reset read signal source, and a Q output that sends a meta-stable state enable signal such that when a reset read signal is received said first read delay flip-flop turns off said meta-stable state enable signal until said enable write signal is turned on when a second (read) clock domain signal pulse from said second (read) clock signal is received at which time said first read delay flip-flop turns on said meta-stable state enable signal and such that said first read delay flip-flop turns off said meta-stable state enable signal when said enable write signal is off; and
   supplying a second read delay flip-flop that is a DQ flip-flop with a D input connected to said meta-stable state enable signal of said first read delay flip-flop, a clock input connected to said second (read) clock signal from said second (read) clock domain, a clear input connected to said reset read signal source, and a Q output that sends an enable read signal such that when a reset read signal is received said second read delay flip-flop turns off said enable read signal until said meta-stable state enable signal is turned on when said second (read) clock domain signal pulse from said second (read) clock signal is received at which time said second read delay flip-flop turns on said enable read signal, such that said second read delay flip-flop turns off enable read signal when said enable meta-stable state enable signal is off, and such that said read data subsystem starts when said enable read signal turns on.

* * * * *